Feb. 26, 1963     M. W. MILLER     3,078,861
CAN AND JUG WASHING MACHINE
Filed June 8, 1962     7 Sheets-Sheet 1

INVENTOR.
MARLOW W. MILLER,
BY
McMorrow, Berman & Davidson
ATTORNEYS.

Feb. 26, 1963  M. W. MILLER  3,078,861
CAN AND JUG WASHING MACHINE
Filed June 8, 1962  7 Sheets-Sheet 2

INVENTOR.
MARLOW W. MILLER,
BY
*McMorrow, Berman & Davidson*
ATTORNEYS.

Feb. 26, 1963   M. W. MILLER   3,078,861
CAN AND JUG WASHING MACHINE
Filed June 8, 1962   7 Sheets-Sheet 4

INVENTOR.
MARLOW W. MILLER,
BY
McMorrow, Berman & Davidson
ATTORNEYS.

INVENTOR.
MARLOW W. MILLER,
BY
McMorrow, Berman & Davidson
ATTORNEYS.

INVENTOR.
MARLOW W. MILLER,
BY
McMorrow, Berman & Davidson
ATTORNEYS.

United States Patent Office 3,078,861
Patented Feb. 26, 1963

3,078,861
CAN AND JUG WASHING MACHINE
Marlow W. Miller, Fairmont, Minn., assignor to Millco Corporation, Fairmont, Minn., a corporation of Minnesota
Filed June 8, 1962, Ser. No. 201,175
12 Claims. (Cl. 134—96)

This invention relates to apparatus for washing receptacles, and more particularly to an improved washing machine for premix tanks and jugs, and similar receptacles, of the type wherein caustic soda or similar cleansing material is employed during the washing cycle.

A main object of the invention is to provide a novel and improved apparatus for washing premix tanks, jugs, and similar receptacles, the apparatus being relatively simple in construction, being safe to use, and providing economical utilization of the cleansing solution employed therein.

A further object of the invention is to provide an improved apparatus for washing premix tanks, jugs, or similar receptacles, wherein caustic soda or similar cleansing solution is employed during the washing cycle, the apparatus providing efficient circulation of the cleansing material and efficient conservation thereof, as well as having means to provide thorough rinsing of the receptacles while minimizing dilution of the cleansing solution by the rinsing water.

A still further object of the invention is to provide an improved apparatus for washing premix tanks, jugs, and similar receptacles, the apparatus being relatively compact in size, being durable in construction, being easy to operate, and being easily adaptable so that it may be employed to wash premix tanks of different sizes, or alternatively, premix tanks or similar receptacles.

A still further object of the invention is to provide an improved washing apparatus for use in washing premix tanks, jugs, and similar receptacles, the apparatus having a plurality of washing and rinsing jets which are strategically located so as to provide highly efficient washing and rinsing action, the jets being so arranged that they are efficient to provide proper rinsing even with relatively low rinse water pressure, the apparatus being provided with heating means for the cleansing solution, the heating means being so located that it will not burn out readily, the apparatus being further provided with means to prevent dripping of rinse water or cleansing solution from the apparatus either while in operation, or while the machine is opened for placing receptacles to be cleaned therein, the machine being relatively portable so that it can be readily moved to a desired washing location, and the machine being provided with efficient heat insulating means, thereby minimizing heat loss from the machine to the adjacent area and reducing its cost of operation.

Further objects and advantages of the invention will become apparent from the following description and claims, and from the accompanying drawings, wherein:

Referring to the drawings, 17 generally designates a typical apparatus for washing premix tanks, jugs, and similar containers, constructed in accordance with the present invention. The apparatus 17 comprises a generally rectangular main housing 18 provided with depending corner legs 19 of a type to which may be readily attached conventional casters or similar wheeled supports so that the apparatus may be readily rolled to a desired washing location. The housing 18 is provided with the upper compartment 20 which is thermally insulated from the exterior wall of the housing by the provision of conventional heat insulating means 21 between said upper compartment and the outer shell of main housing 18. The upper compartment 20 is provided with the hinged front door 22 which defines substantially the entire front wall of the upper compartment, said front door being provided with the conventional latch 23 having the cooperating catch element 24, the latch 23 being arranged so that it lockingly engages with the catch element 24 when the door 22 is closed and holds the door closed until the handle 25 of the latch is manually operated. The bottom wall 26 of compartment 20 slopes downwardly towards its center and is connected at its center with a drain conduit 27, a perforated vertically rising screen 28 being provided in the central drain opening of bottom wall 26, as is clearly shown in FIGURE 3.

Figure 3:
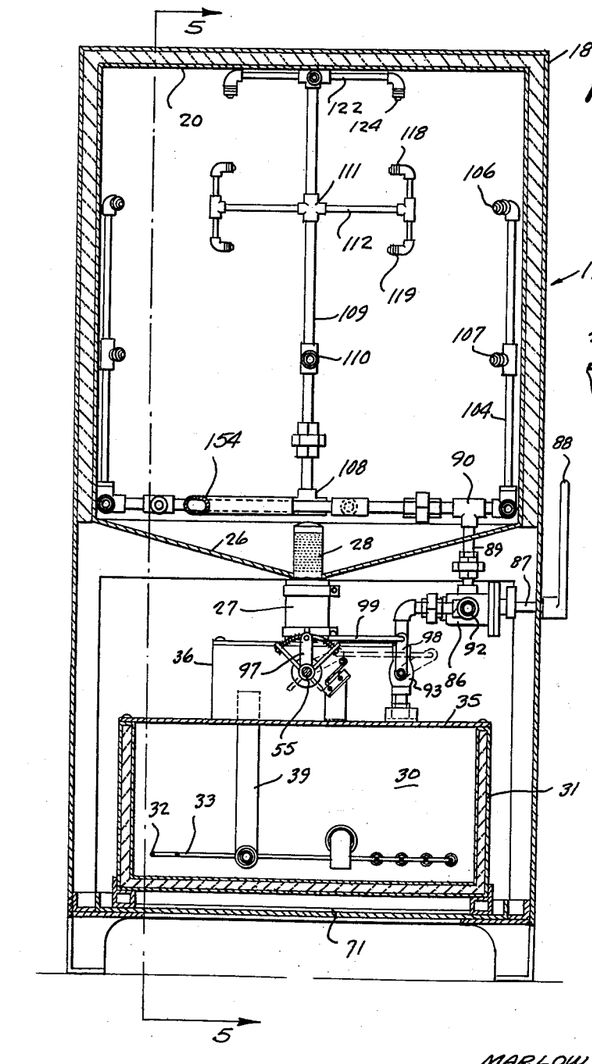
FIGURE 3 is a vertical cross sectional view taken substantially on the line 3—3 of FIGURE 2.
Figure 4:
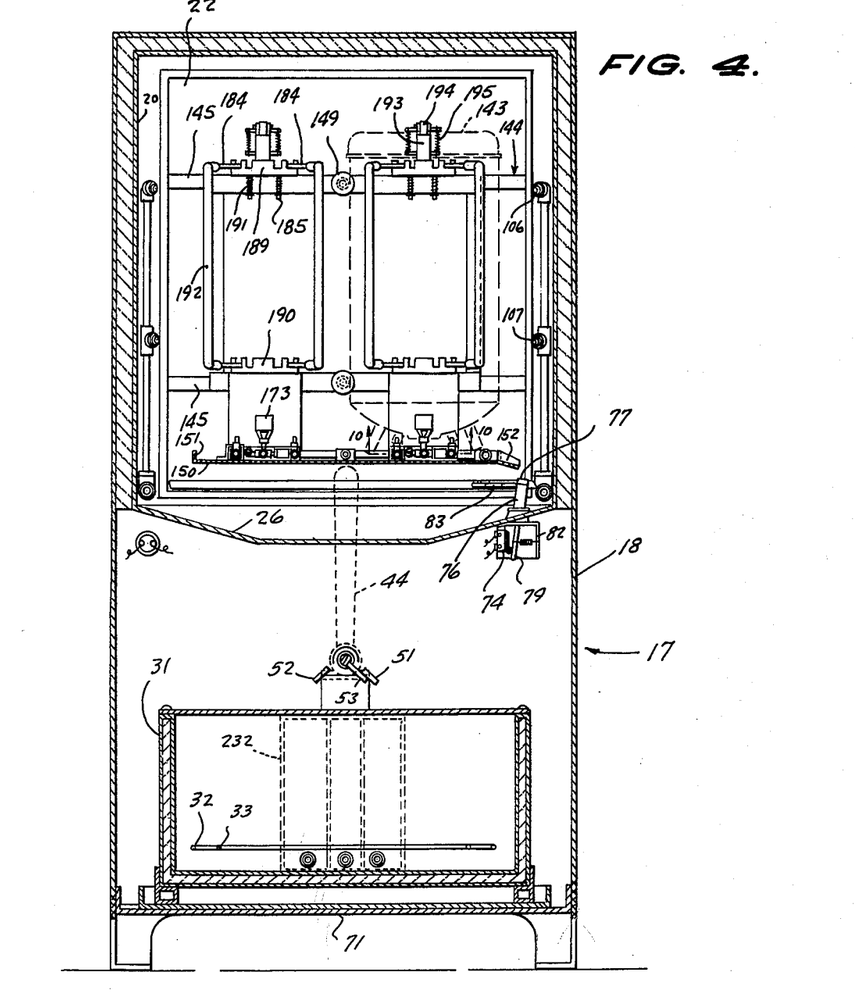
FIGURE 4 is a vertical cross sectional view taken substantially on the line 4—4 of FIGURE 2.
Figures 5, 6, 7:
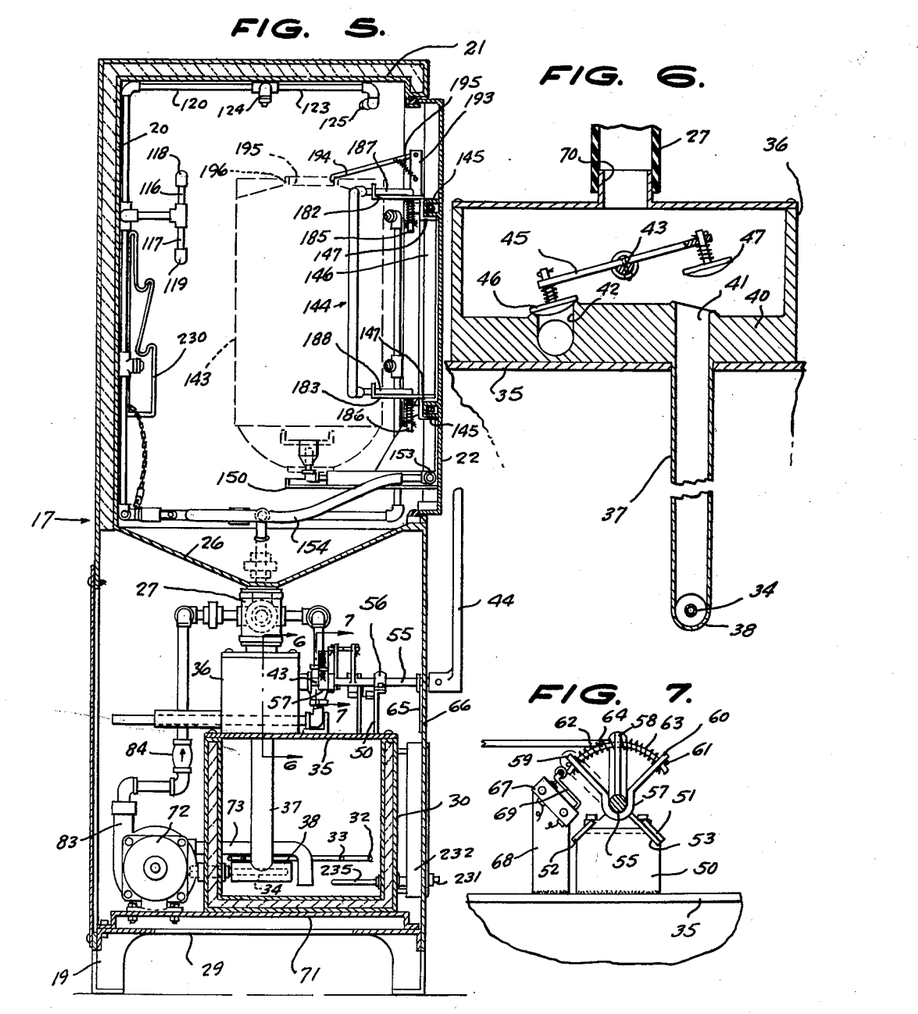
FIGURE 5 is a transverse vertical cross sectional view taken through the machine, substantially on the line 5—5 of FIGURE 3.
FIGURE 6 is an enlarged fragmentary vertical cross sectional view taken substantially on the line 6—6 of FIGURE 5.
FIGURE 7 is an enlarged fragmentary vertical cross sectional view taken substantially on the line 7—7 of FIGURE 5.

The housing 18 is provided with a bottom shelf or wall 29 on which is mounted the sump reservoir 30 adapted to contain a substantial quantity of cleansing liquid, such as caustic soda, or the like. As shown in FIGURES 3, 4 and 5, the reservoir 30 is provided with hollow walls containing heat insulating material 31. Horizontally mounted in the lower portion of the sump reservoir 30 are a pair of electrical heating elements 32 and 33, said heating elements being mounted in a common horizontal plane. Also mounted in the lower portion of the sump reservoir 30 is a temperature sensing element 34 of conventional construction which is electrically connected in the energizing circuit of the heating elements so as to automatically energize the heating elements when the temperature of the liquid cleansing material drops below a desired predetermined value.

Reservoir 30 is provided with the top wall 35 on which is mounted a valve housing 36 having a depending return conduit 37 connected to its bottom and extending into the sump reservoir 30, a horizontal open ended short conduit 38 being connected to the bottom end of the vertical conduit 37, and the temperature sensing element 34 associated with the thermostat above described being axially disposed in the horizontal open ended conduit 38, as shown in FIGURE 5. Also connected to the valve housing 36 is a depending waste conduit 39 leading to a suitable external waste sump. The return liquid conduit 37 communicates with the bottom wall 40 of the valve housing 36 at a vertical port 41, and the waste conduit 39 communicates with bottom wall 40 at a vertical port 42, as shown in FIGURE 6.

Journaled transversely in the valve housing 36 is a shaft 43 on which is secured an arm 45. Resiliently secured to the opposite end portions of the arm 45 are respective valve elements 46 and 47 which are sealingly engageable in the top ends of the respective ports 42 and 41, depending upon the rotated position of the shaft 43. In the position of the shaft 43 shown in FIGURE 6, the valve element 46 engages in the top end of the port 42, whereas the valve element 47 is free of the port 41, exposing the port 41 to the interior of valve housing 36. When the shaft 43 is rotated in a clockwise direction from the position of FIGURE 6, the valve element 47 may be sealingly engaged in the top end of the port 41, and the valve element 46 will be lifted free of the port 42, so that the interior of the valve housing 36 is placed in communication with the waste conduit 39 and sealed off with respect to the return conduit 37.

Designated at 55 is an operating shaft which is axially aligned with the shaft 43 and which is journaled in a suitable bearing bracket 56 secured to the top wall 35 of sump reservoir 30. The shaft 43 is provided with a sleeved end portion 57 which rotatably receives the shaft 55, the shaft 55 having rigidly secured thereto a radially outwardly extending arm 58, and the end portion 57 having rigidly secured thereto a pair of outwardly extending arms 59 and 60 substantially in the same transverse radial plane as the arm 58, the arm 58 being located between the arms 59 and 60. An arcuate guide rod 64 extends slidably through the end portion of arm 58 and is retained in the end portions of the arms 59 and 60 by cotter pins 61. Coiled springs 62 and 63 are mounted on the rod 64 between arm 58 and the arms 59 and 60. The springs 62 and 63 thus establish a resilient driving connection between shaft 55 and the valve shaft 43. A vertical plate member 50 is rigidly secured to the top wall 35 of sump reservoir 30 beneath and transverse to the shaft 55, the top corners of the plate 50 being provided with the respective upwardly and inwardly inclined stop lugs 51 and 52, arranged symmetrically on opposite sides of the shaft 55, as shown in FIGURE 7. A depending stop arm 53 is secured to the shaft 55 and is engageable with the lugs 51 and 52 to limit rotation of the shaft 55 to an angle of approximately 90°. In the position shown in FIGURE 7, wherein the arm 53 engages the lug 51, the shaft 43 is in a position corresponding to that shown in FIGURE 6, namely, wherein valve element 46 sealingly engages in the port 42. By rotating shaft 55 90° from the position shown in FIGURE 7 to bring the arm 53 into engagement with the stop lug 52, the shaft 43 is similarly rotated, opening the valve port 42 and closing the valve port 41.

An operating handle 44 is secured to the outer end of shaft 55. In the upright position of the handle 44, shown in FIGURES 1 and 5, the valve port 41 is open and the valve port 42 is closed.

As will be apparent from FIGURE 5, the handle 44 is of substantial length, and is sufficiently long that when it is in its upright position it lies in the path of swinging movement of the door 22, thus preventing the door from being swung to an open position when the handle 44 is in its upright operating position, namely, in a position wherein the shaft 43 is positioned as illustrated in FIGURE 6.

Any suitable means may be provided for yieldably locking the shaft 55 in either of the two rotated positions of the shaft, namely, wherein the arm 53 engages the lug 52 or 51. Thus, a resilient locking arm 65 may be secured to the shaft 55, the locking arm being provided with a lug 66 at its end portion which is engageable in recesses provided in the inside surface of the front wall of cabinet 18, the recesses being located in positions corresponding to the two extreme positions of the handle 44, namely, the upright position of said handle 44 shown in FIGURE 5, and the opposite position thereof, namely, that wherein shaft 43 is rotated 90° from the position shown in FIGURE 6 to the position wherein valve element 47 engages in port 41 and the port 42 is opened.

Secured on the top wall 35 adjacent the plate 50 is an upstanding bracket plate 68, the plate 68 being located adjacent the lug 52. A microswitch 67 is mounted on the top portion of the plate 68 in a position so that its operating element 69 is engageable by the end of the arcuate rod 64 when the shaft 43 is in the position thereof shown in FIGURE 7, namely, when the operating handle 44 is in its upright working position. Thus, the switch 67 is closed when handle 44 is in its upright position and is opened when the handle 44 is rotated counterclockwise from the position shown in FIGURE 1, namely, toward its opposite position wherein port 41 is closed and port 42 is open, as above described.

Figure 12:
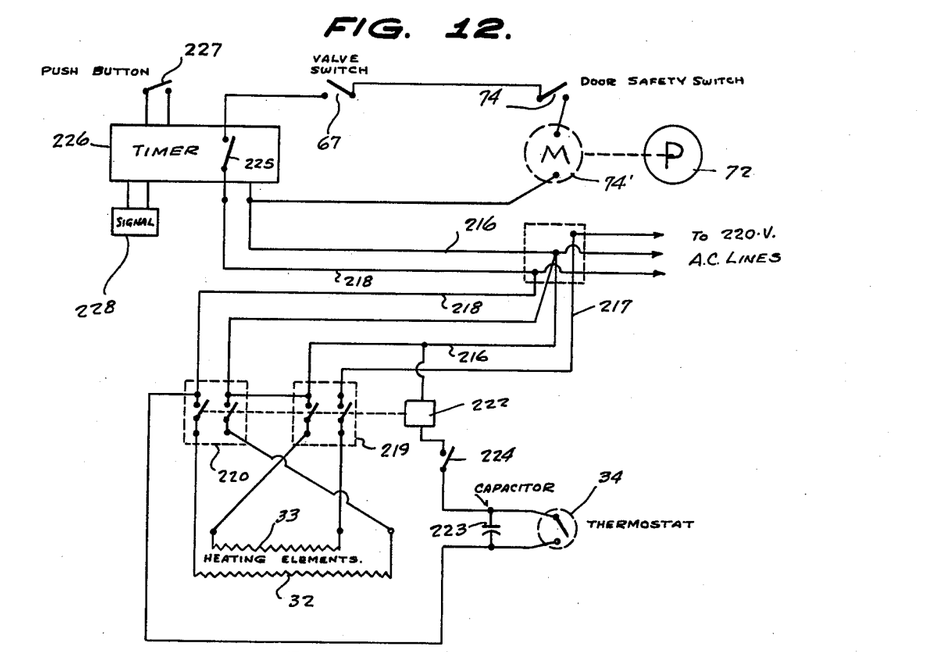
FIGURE 12 is a schematic electrical wiring diagram showing certain of the electrical elements of the washing apparatus and the switching apparatus associated therewith.

As shown in FIGURE 6, the flexible conduit 27 which may comprise a short length of rubber hose, connects the outlet of the centrally convergent bottom wall 26 to an upstanding conduit element 70 provided centrally in the top wall of valve housing 36. The sump reservoir 30 is mounted on an upwardly offset supporting plate 71 secured on the bottom wall 29 of cabinet 18. Mounted on the bracket plate 71 adjacent the sump reservoir 30 is a pump 72 having an intake conduit 73 extending into the sump reservoir 30 and opening adjacent the bottom of said sump reservoir. Pump 72 is driven by an electric motor 74' whose energizing circuit includes the microswitch 67 and a door-operated safety switch 74, as shown in FIGURE 12.

Figure 8:
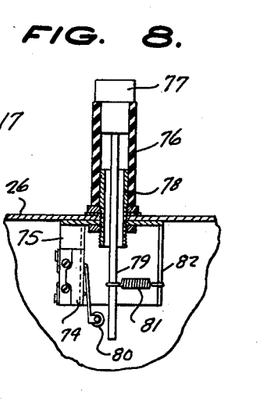
FIGURE 8 is an enlarged vertical cross sectional view taken through the door-operated safety switch structure employed in the washing apparatus of FIGURES 1 to 7.

As shown in FIGURES 3 and 4, the switch 74 comprises a microswitch which is mounted on a depending supporting bracket 75 secured to the underside of bottom wall 26 adjacent to the lower corner portion of door 22 at the hinged side thereof. An upstanding resilient sleeve 76 is secured to wall 26 over the area containing the bracket plate 75, and a rigid plug 77 is mounted in the top end portion of the sleeve 76. As shown in FIGURE 8, the sleeve 76 is secured on the top portion of a rigid bushing member 78 secured in an aperture in the bottom wall 26. A rod 79 is rigidly secured axially to the plug 77 and extends downwardly through the sleeve 76 and the bushing 78 to a position adjacent the operating element 80 of microswitch 74. A coiled spring 81 connects the rod 79 to a flange 82 on bracket 75. The spring 81 normally biases the rod 79 to a position disengaged from the operating element 80, so that switch 74 is open when door 22 is swung open. An abutment member 83 is secured to the lower marginal portion of the door, said abutment member projecting horizontally inwardly and being located so as to engage the top portion of the upstanding resilient structure defined by sleeve 76 and plug 77 when the door is closed, to flex the upstanding resilient structure laterally in the manner illustrated in FIGURE 4 and in a direction to cause the rod 79 to come into operative engagement with the element 80 so as to close the microswitch 74. Thus, switch 74 is closed only when door 22 is closed and automatically opens when the door 22 is swung to an open position. Since the safety switch 74 is connected in the energizing circuit of the motor 74', the pump 72 is automatically deenergized whenever door 22 is opened.

The outlet 83 of pump 72 is connected through a check valve 84 and suitable piping, including a strainer 85 to the input port of a three-way valve 86 which is mounted adjacent the right side wall of cabinet 18, as viewed in FIGURE 3, the valve 86 being provided with an operating shaft 87 extending outside the cabinet and having secured thereon an operating handle 88. Connected to the outlet port of the valve 86 is a conduit 89 extending upwardly and leading to a T fitting 90 which is in turn connected to the cleansing jet system of the apparatus, as will be presently described. The valve 86 is provided with a second inlet port, shown at 92. A fresh water supply conduit 94, connected to a suitable supply of fresh water at normal supply pressure, is connected to the inlet port 92 through suitable piping including a control valve 93 which is coupled to the main valve-operating shaft 55 by a linkage comprising an arm 97 secured on shaft 55, an arm 98 secured on the operating shaft of valve 93, and a link rod 99 connecting the arms 97 and 98. The valve 93 is held closed when the operating handle 44 is in its upright position, illustrated in FIGURES 1 and 3, so that the supply of fresh water is cut off, but said valve 93 is opened when handle 44 is swung counterclockwise from the position thereof shown in FIGURE 1 to its lateral position wherein arm 53 engages lug 52, opening the valve 93 and admitting fresh water to the inlet port 92 of three-way valve 86. If the operating handle 88 of valve 86 is then moved to a position connecting inlet port 92 with the outlet conduit 89, water is delivered at supply pressure to the cleansing jet system of the apparatus.

As will be presently described, during the initial portion of the washing cycle, namely, when the objects being cleansed are exposed to jets of hot caustic soda, or similar cleansing liquid, the liquid drains back to the sump reservoir 30 through the conduit 27, the valve housing 35 and the conduit 37 leading to the horizontal open discharge outlet member 38. The liquid is circulated by the pump 72 to the cleansing jet system of the apparatus, the liquid being delivered to the pump 72 through the intake conduit 73, and being forced by said pump upwardly through its outlet 83 and the check valve 84, through valve 86, conduit 89 and T fitting 90 to the cleansing jet system of the apparatus. This distribution of the liquid occurs when the operating handle 44 is in its upright position and the operating handle 88 is in a position wherein the valve 86 connects the output line of the pump to the outlet conduit 89. With handle 84 rotated to its lowered, or laterally extending, position, the pump 72 is deenergized, as above explained, port 41 is closed and port 42 is opened, and the fresh water supply valve 93 is opened. By then rotating the handle 88, valve 86 may be adjusted to connect the fresh water supply port 92 to the outlet conduit 89, so that fresh water is admitted into the cleansing jet system of the apparatus, but cannot drain into the sump reservoir 30, since the port 41 is closed. Thus, the rinsing water drains through the port 42 into the waste disposal system through the waste pipe 39 and does not dilute the liquid cleansing material in the sump reservoir 30.

Figures 1, 13, 16:
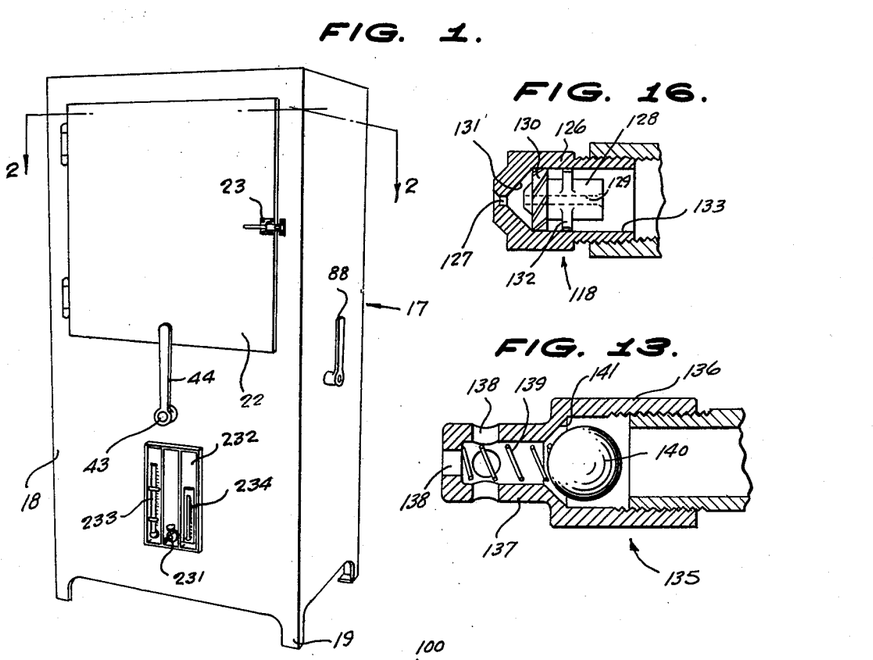
FIGURE 1 is a front perspective view of an improved can and jug washing apparatus constructed in accordance with the present invention.
FIGURE 13 is an enlarged fragmentary vertical cross sectional view taken substantially on the line 13—13 of FIGURE 2.
FIGURE 16 is an enlarged fragmentary vertical cross sectional view taken substantially on the line 16—16 of FIGURE 2.
Figure 14:
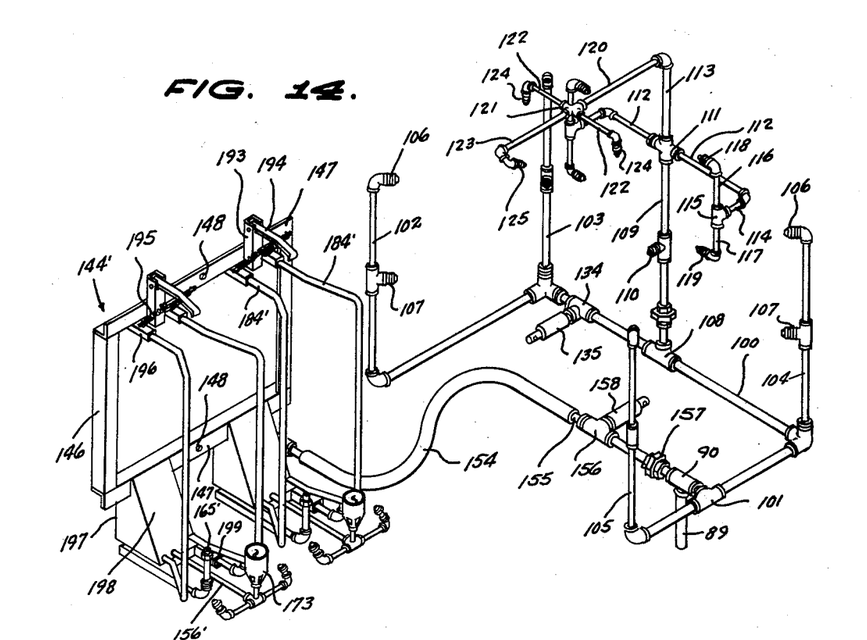
FIGURE 14 is a perspective view showing the various conduits and distribution nozzles associated with the washing apparatus of FIGURES 1 to 13, shown connected to a modified form of attachment specifically intended for use in washing premix tanks.

A fixed spray nozzle system is mounted inside the main enclosure 20 of the apparatus, said system comprising a generally U-shaped horizontal lower header assembly 100 connected to one end of the head portion of T fitting 90 through a T fitting 101, as shown in FIGURE 14. Connected to the ends and the respective corners of the rectangular U-shaped header conduit assembly 100 are the respective vertical headers 102, 103, 104 and 105, each provided with an inwardly directed horizontal top nozzle assembly 106 and with an intermediate inwardly directed horizontal nozzle assembly 107. The nozzle assemblies 106 and 107 are of similar construction, and are similar to the nozzle assembly illustrated in detail in FIGURE 16, presently to be described.

Connected to the intermediate portion of the rear arm of the header assembly 100 by a T fitting 108 is a vertical header conduit 109 provided at its intermediate portion with an inwardly extending horizontal nozzle assembly 110 similar to the nozzle assemblies 106 and 107.

A cross fitting 111 is connected to the top end of the conduit 109, and connected thereto are respective laterally extending conduit arms 112, 112 and a vertically extending conduit arm 113. Connected to the end of each conduit arm 112 is an inwardly directed short conduit 114 to the end of which is connected a T fitting 115. Respective oppositely directed vertical conduits 116 and 117 are connected to the ends of the head portion of T fitting 115, and connected to the end of each conduit 116 and 117 are respective horizontally directed nozzle assemblies 118 and 119, the respective pairs of nozzle assemblies 118 and 119 being directed inwardly towards each other, as shown in FIGURE 14 and extending parallel to the conduit arms 112.

Connected to the top end of the vertical conduit 113 is a header conduit 120 including a cross fitting 121 to which are connected the respective horizontal conduit arms 122, 122 extending parallel to the arms 112 and the transversely extending horizontal conduit arm 123 aligned with the header conduit 120. Connected to the ends of the arms 122, 122 are the respective depending, downwardly directed nozzle assemblies 124, 124, and connected to the end of the conduit 123 is the downwardly and inwardly inclined nozzle assembly 125, the nozzle assemblies 118, 119, 110, 124 and 125 being identical with the nozzle assemblies 107 and 106, and being shown in detail in FIGURE 16.

As shown in FIGURE 16, each of the aforesaid nozzle assemblies is provided with the main nozzle fitting 126 which terminates in a restricted, centrally located end orifice 127 and which contains a core member 128 loosely positioned therein and formed with a central axial bore 129 and with a spirally grooved end flange 130. The core member 128 is restricted against outward movement by the engagement of the flange 130 with the convergent frusto conical inside end wall surface 131 of the nozzle head 126. The spiral groove in the periphery of the flange 130 serves to produce a swirling action of the stream of liquid passing the periphery of the flange, giving the stream a rotary or swirling configuration as it passes through the nozzle orifice 127, the stream mixing with another stream of liquid passing through the axial bore 129. The resultant spray jet emerging from the orifice 127 rotates while it is being propelled forwardly by the liquid pressure, whereby providing a highly efficient cleansing action when it impinges upon the surfaces of a can or receptacle located in its path of movement.

As shown in FIGURE 16, the core member 128 is also provided with radially projecting spacer legs 132 which are engageable with the inside surface of the cylindrical main bore portion 133 of the nozzle head member 126 and serve as centering means for the core member 128.

The rear arm of the U-shaped bottom header assembly 100 includes a T fitting 134 to which is connected a pressure-responsive drain valve assembly 135, shown in detail in FIGURE 13. The drain valve 135 is employed to allow the liquid jet distribution system to automatically drain responsive to the removal of working fluid pressure in the system. Thus, the automatic drain valve 135 comprises a valve head portion 136 having a reduced end element 137 provided with drain apertures 138 and containing a coiled spring 139 which exerts an unseating force on a valve ball 140 disposed adjacent a frusto conical valve seat 141 formed between the enlarged main portion of the head member 136 and the reduced portion 137. When working liquid pressure exists in the system, the pressure acts on the ball 140 to cause it to sealingly engage with the frusto conical seat 141 and thus seal the system. When the working pressure is removed, the ball 140 is caused to unseat by the expansion of the spring 139, thereby allowing the distribution system to drain through the apertures 138.

The valve ball 140 will be held seated either when the jet distribution system is under the pressure developed by the pump 72, namely, when the cleansing liquid is being discharged through the cleaning nozzles, or when the system is under the pressure of the rinsing water from the external water supply source. When either of these liquid pressures are removed, ball 140 unseats, allowing the nozzle distribution system to drain through the apertures 138, as above mentioned. This feature enables the cleansing liquid to be drained from the nozzle distribution system before the rinsing water is admitted thereto, thereby further preventing dilution of the cleansing liquid returned to the sump reservoir 30.

When the apparatus is to be employed for washing conventional premix tanks, such as that outlined in dotted view at 143 in FIGURES 4 and 5, a supporting assembly therefor, shown at 144, is secured to the inside surface of the door 22. Thus, said door inside surface has secured thereto the vertically spaced horizontally extending hollow ribs or channels 145, 145. The attachment 144 comprises a generally rectangular frame 146 having the top and bottom angle bars 147, 147, the frame 146 fitting between the ribs 145, 145 with the vertical flanges of the bars 147 abutting the vertical walls of said ribs. The vertical flanges of the bars 147 are provided with apertures 148, and thumb screws 149 are engageable through the apertures 148 and are threadedly engageable in the vertical walls of the ribs 145, whereby to detachably secure the frame 146 to the door 22.

A horizontal drain pan 150 of substantial area is secured to the lower portion of the inside surface of door 22 and projects inwardly therefrom, the drain pan 150 having an upstanding peripheral flange 151 and being provided at one end thereof with a downwardly and outwardly inclined drain channel 152. Secured in the portion of the pan 150 adjacent the door 22 and extending parallel thereto is a header conduit 153 which is connected by a length of flexible conduit 154 to a conduit 155 connected through a T fitting 156 and a conventional union coupling 157 to the end of the head portion of T fitting 90 opposite the T fitting 101. Connected to the stem portion of the T fitting 156 is a pressure-responsive drain valve 158 identical with the drain valve 135, and which opens responsive to the absence of liquid pressure in the supply conduit 89, whereby to allow liquid to freely drain from the jet distribution system connected to the header conduit 153, presently to be described, and which is located above the level of the T fitting 156.

Figure 9:
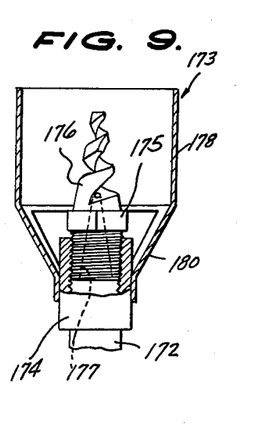
FIGURE 9 is an enlarged vertical cross sectional view taken substantially on the line 9—9 of FIGURE 2.
Figure 10:
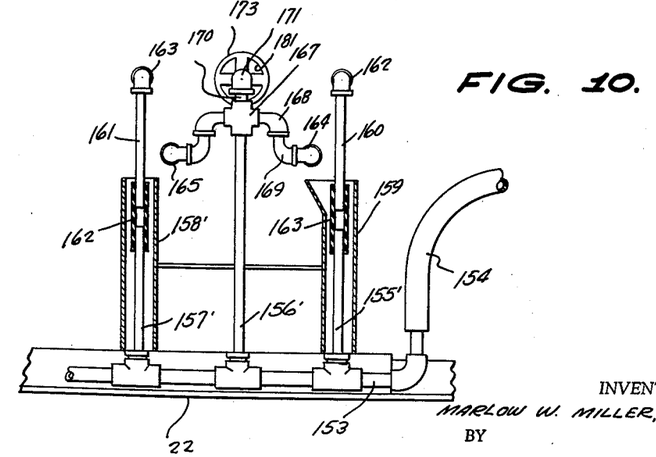
FIGURE 10 is an enlarged fragmentary horizontal cross sectional view taken substantially on the line 10—10 of FIGURE 4.
Figure 11:
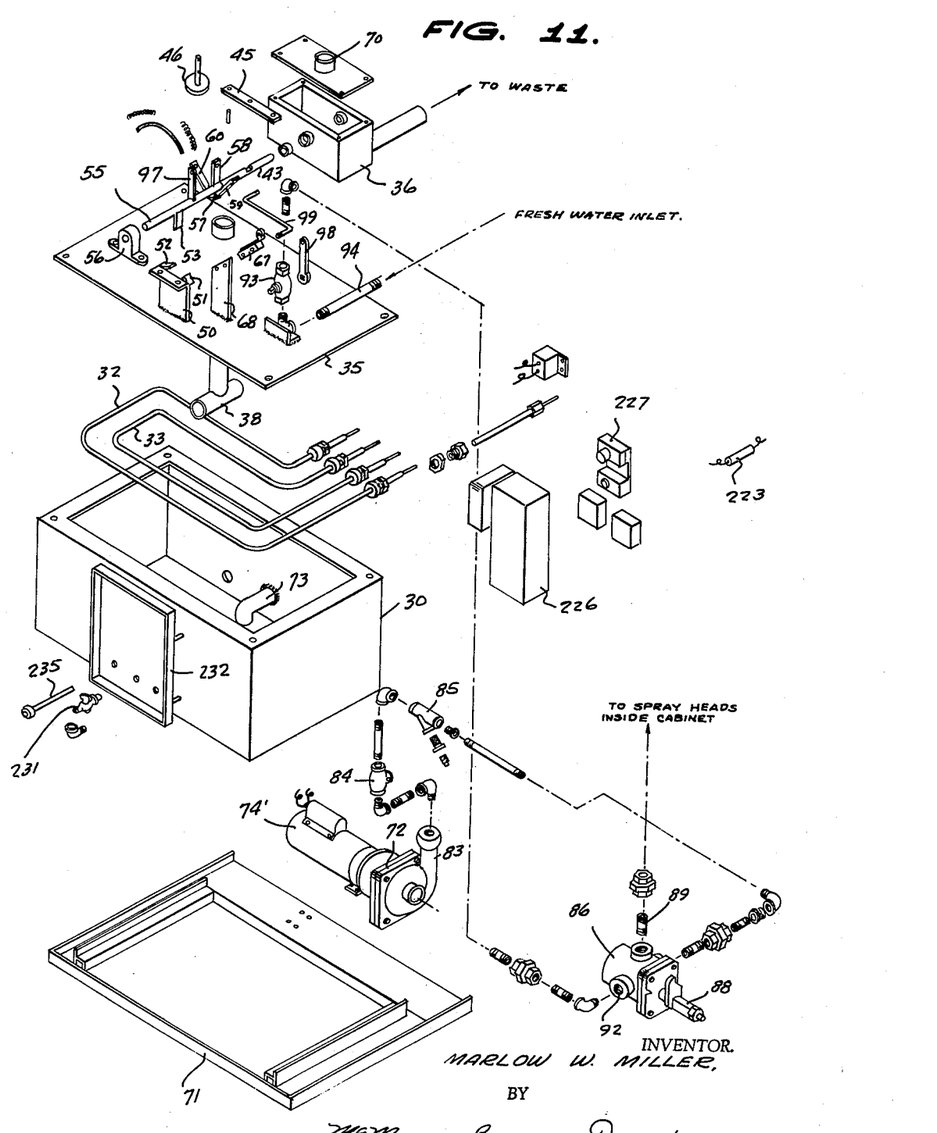
FIGURE 11 is a perspective view showing portions of the washing apparatus of FIGURES 1 to 10 in separated positions, said portions including the elements associated with the cleansing liquid pump and rinsing water control valve and the electric heaters associated with the sump reservoir for the cleansing liquid.

Connected to and extending horizontally from the header conduit 153 are two sets of transversely extending branch conduits similar to those illustrated in FIGURE 10, and designated respectively 155', 156' and 157'. The conduits 155' and 157' of each set are spaced symmetrically on opposite sides of the intervening conduit 156' associated therewith, as shown in FIGURE 10, and are housed in transversely extending cover sleeves shown respectively at 158' and 159. Said cover sleeves may be secured to the drain pan 150 in any suitable manner. The conduits 155' and 157' are connected to respective conduit members 160 and 161 by flexible conduits 162 and 163. The conduits 160 and 161 are provided at their ends with upwardly directed spray nozzles 162 and 163 identical to the nozzles 118, previously described. Similar upwardly directed spray nozzles 164 and 165 are connected to the end portion of the intermediate conduit 156' by suitable cross and elbow fittings, shown at 167, 168 and 169, the upwardly directed spray nozzles 164 and 165 being spaced symmetrically on opposite sides of the conduit 156' and inwardly toward the door 22 with respect to the spray nozzles 162 and 163, as is clearly shown in FIGURE 10. Connected to the outer branch of the cross fitting 167 is a short conduit 170 provided with an elbow fitting 171, and connected to the upturned branch of elbow fitting 171 is a conduit 172 to the top end of which is connected a spray nozzle, shown generally at 173 in FIGURE 9. The spray nozzle 173 comprises a main supporting sleeve 174 which is connected to the top end of the conduit 172, and an inner plug 175 which is threadedly engaged in the sleeve 174 and which is formed with the upwardly tapering spirally shaped discharge nozzle 176. As shown in FIGURE 9, the discharge nozzle 176 is convoluted to define an upwardly tapered spiral and is provided with the bore 177 through which liquid is allowed to discharge upwardly and to be spirally directed by the nozzle 176.

The liquid discharging from the convergent bore 177 engages the spirally shaped, upwardly tapering convolutions of the nozzle 176 and the liquid stream is deflected thereby, thereby producing a relatively widely convergent upwardly directed jet having a substantial amount of rotation around the vertical axis of the nozzle 173, so that the jet provides a scrubbing action inside a container 143 positioned over the jet. An upwardly projecting protective skirt 178 is secured to the main support member 174, surrounding the spirally upwardly tapering convoluted jet nozzle 176, the skirt member 178 having a downwardly convergent, substantially frusto conical bottom portion 180 which is formed with drain apertures 181, as shown in FIGURE 10, to allow liquid to drain freely from the skirt member 178.

As shown in FIGURE 10, the central nozzle assembly 173 is located midway between and in alignment with the outer spray nozzles 162 and 163. As will be presently explained, the container 143 is adapted to be positioned over the nozzles 163, 165, 164 and 162, with the intermediate nozzle assembly 173 positioned immediately beneath the mouth of the container 143, so that the interior of the container receives the jet from the nozzle 173, whereas the nozzles 163, 165, 164 and 162 discharge against the adjacent bottom surfaces of the container 143, which is supported in an inverted position, as illustrated in dotted view in FIGURE 5. As further shown in FIGURE 5, the nozzle assembly 173 extends upwardly into the container through the main opening thereof so that the nozzle assembly 173 is actually located inside the container during the washing operation.

The nozzles 164 and 165 may be suitably inclined so as to project the liquid in the most efficient direction for cleansing the inclined or curved surfaces of the container 143 located adjacent thereto.

Rigidly secured to the frame bars 147, 147 are respective pairs of vertically aligned, horizontally extending inwardly projecting plate members 182 and 183, said pairs of vertically spaced horizontal plate members being respectively located adjacent the sets of nozzles 162, 164, 165, 163 and 173. Respective pairs of generally U-shaped vertical abutment bars 184, 184 are secured to the respective pairs of plates 182 and 183, the top arms of the abutment bars being formed with depending stud portions 185 pivotally engageable in the top plate members 182 and the lower arms of the U-shaped members 184 being similarly formed with depending stud members 186 pivotally engageable in the lower plate members 183, the stud members 185 and 186 being in vertical alignment. The top and bottom arms of the members 184, shown respectively at 187 and 188 are lockingly engageable in upstanding notched flanges 189 and 190 formed on the outer edges of the plate members 182 and 183, the U-shaped members 184 being biased downwardly so as to maintain their arms in locking engagement in the notches of the flanges 189 and 190 by coiled springs 191 surrounding the depending stud members 185 and 186 and bearing between the plate members 182 and 183 and washers secured on the lower portions of said stud members.

The vertical bight portions of the U-shaped members 184 are provided with resilient deformable coverings 192, which may comprise rubber sleeves or sleeves of similar resilient deformable material.

Figure 2:
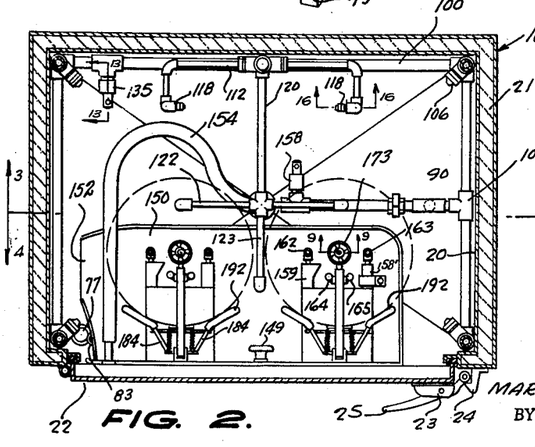
FIGURE 2 is an enlarged horizontal cross sectional view taken substantially on the line 2—2 of FIGURE 1.

As will be readily apparent from FIGURES 4 and 5, the members 184, 184 may be adjusted to suitably divergent relationship, for example, in the manner illustrated in FIGURE 2, so as to define bearing supports against which the containers 143 may be held, with the central bottom jet assemblies 173 projecting into the mouths of the containers.

Respective upstanding brackets 193 are secured to the rear marginal portions of the upper plate members 182 between the pivotal connections of the arms 187 to said upper plate members, and pivoted to the top portions of said brackets 193 are respective retaining hook members 194 biased downwardly by springs 195 connecting the hook arms 194 to the brackets 193, as shown in FIGURE 5. The hook arms 194 are engageable in the center recess 195 defined by the annular bottom flange 196 of a conventional syrup can 143, as shown in FIGURE 5, whereby to retain the inverted can in a proper position against the vertical arms of the members 184, 184 and with the upwardly projecting main bottom nozzle assembly 173 received in the mouth of the container.

By the provision of the notched flanges 189 and 190, the U-shaped members 184 may be adjusted to suitable divergent relationship in accordance with the size of the container to be engaged thereagainst. Thus, the arms are adjusted to positions of relatively wide divergency to receive a large container, but may be adjusted to positions defining a smaller angle therebetween in order to properly receive a smaller container. In the form of the invention illustrated in FIGURE 14, the pairs of U-shaped supporting arms, shown at 184', 184', are rigidly connected to the frame structure of the door-carried attachment, designated generally at 144', the top portions of the U-shaped members 184' being rigidly secured in transversely extending sleeves 196 secured to the top angle bars 147, and the lower arms of the members 184' being rigidly secured in the lower portions of the downwardly and inwardly sloping front walls 198 of the respective depending housings 197, 197 secured to the bottom angle bar 147.

It will be noted that suitable upstanding conduits 199 may be provided, terminating in discharge nozzles 165', the conduits 199 being engageable in auxiliary openings in the inverted containers 143 for introducing additional liquid jet discharges into the interior of the container besides that provided by the central internally discharging nozzle assembly 173.

Figure 15:
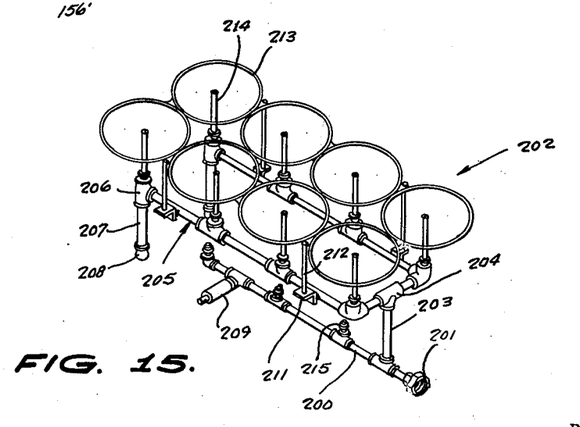
FIGURE 15 is a perspective view showing an attachment which may be employed in the assembly of FIGURES 1 to 13 or 14 to convert the machine for use in washing premix tanks, or similar containers.

FIGURE 15 illustrates an alternative form of container supporting rack which may be employed in place of the door-mounted supporting assembly of FIGURES 1 to 13 or FIGURE 14, the supporting rack of FIGURE 15 being specifically adapted for use in washing syrup jugs or bottles, or other receptacles of a similar nature. Thus, when the rack device of FIGURE 15 is to be employed, the door-mounted rack is removed by unfastening the thumb screws 149 and disconnecting the same from the liquid supply system at the union coupling 157. The rack device of FIGURE 15 is then connected to the liquid supply system at the union coupling 157, the rack device of FIGURE 15 being provided with a header conduit 200 having a union nut 201 adapted to be connected to the main liquid supply system adjacent the T fitting 90 at the union connection 157. As shown in FIGURE 15, the jug-washing supporting attachment, designated generally at 202 comprises the header conduit 20, previously mentioned, which is provided adjacent the union connection 201 with a vertically rising conduit 203 which terminates in a T fitting 204. The T fitting 204 is connected in the intermediate portion of the transverse arm of a generally U-shaped horizontal header assembly 205 having T fittings 206 at the ends of its legs, the T fittings being arranged vertically, as shown. Connected to the depending branches of the T fittings 206 are respective vertical conduits 207 which are sealed off at their bottom ends by caps 208, the conduits 207 defining supporting legs for the ends of the side legs of the U-shaped header assembly 205.

The longitudinal bottom header conduit 200 is provided with a pressure-responsive drain valve 209 which is identical to the drain valves 158 and 135, previously described.

Secured to the side arms of the U-shaped header assembly 205 are respective angle brackets 211 to which are rigidly secured upstanding rods 212 to the top ends of which are rigidly secured a jug-receiving assembly comprising a plurality of circular rings 213 which are welded together at their contacting peripheral portions to define a unitary member rigidly connected to and supported by the side arms of header assembly 205 by the rods 212 and brackets 211. The rings 213 are supported in coaxial relation with respective vertical nozzle tubes 214 which extend upwardly in positions to be received in the necks of conventional syrup jugs, or similar containers, engaged in the rings 213 in inverted positions, so that the tubular nozzles 214 are effective to provide cleansing and rinsing jets in the interior of the jugs. The longitudinally extending bottom header tube 200 is provided with a plurality of upwardly directed spray nozzles 215 which are similar to the nozzle 118 shown in FIGURE 16.

The attachment 202 is adapted to be received in the lower portion of the compartment 20 with the door-supported can-washing assembly removed, as previously described.

Referring to FIGURE 12, it will be seen that the heating elements 32 and 33 are respectively connected between a neutral line wire 216 and the respective ungrounded line wires 217 and 218 of the usual three-wire electrical power supply system. Conventional two-pole single throw switch units 219 and 220 operated by a solenoid 222 are connected in the energizing circuits of the heating elements 32 and 33, the solenoid 222 being connected between the neutral line wire 218 and the ungrounded line wire 216 through the thermostatically controlled switch unit 34. A suitable capacitor 223 is connected across the terminals of the thermostatic switch 34, as shown. If so desired, the circuit of the heater control solenoid 222 may include a suitable manually operated control switch 224.

The pump motor 74' is connected between the neutral line wire 216 and the ungrounded line wire 218 through the door-controlled safety switch 74, the valve-controlled switch 67, and a switch 225 forming part of a conventional timer assembly 226. The timer assembly 226 includes a starting push button 227 and a signal device 228 which may comprise a buzzer, lamp, or other suitable electrically operated signalling means.

The timer 226 is of conventional construction and is designed to provide the required cycle of pump operation and to signal the time at which manual operation of the levers 44 and 88 is required. The timer 226 is designed so that when the push button 227 is closed, the switch 225 will be closed for a first period, of the order of fifty seconds, after which the switch 225 will open. After a second period, of the order of twenty seconds, the signalling device 228 will be energized, notifying the operator to rotate the levers to the horizontal or "rinse" positions. After a further period, sufficient for proper rinsing, which may be of the order of a minute, the signal device 228 again operates, indicating the end of the washing cycle.

In operation, with the apparatus loaded and with the door 22 closed, the handles 44 and 88 are placed in their vertical upright positions, as illustrated in FIGURE 1.

Switch 224 is closed so that the heaters 32 and 33 may be energized, subject to the control of the thermostat 34, to maintain the cleansing liquid, for example, caustic soda, at a desired elevated temperature. The starting push button switch 227 is then closed, which causes the pump motor 74' to become energized, since the switches 74, 67 and 225 are closed. The apparatus then operates for a period of approximately sixty seconds to circulate the cleansing liquid and to apply the liquid jets to the containers in the apparatus to thoroughly cleanse the various surfaces of the containers. At the end of the cleansing period, namely, the initial period of fifty seconds above mentioned, the switch 225 opens, de-energizing the pump motor 74', thereby dropping the pressure in the distribution system sufficiently to allow the pressure-responsive drain valve to open. In the forms of the invention illustrated in FIGURES 1 to 14, these drain valves comprise the valves 135 and 158. When the attachment of FIGURE 15 is employed, the drain valves comprise the valves 135 and 209.

At the end of the twenty second draining period, during which time the liquid drains back into the sump reservoir 30, the signal device 228 is energized, and the operator then rotates the levers 44 and 88 to horizontal positions, thus beginning the rinse cycle. In the rinse cycle, as above described, fresh water from the water supply source is introduced into the liquid distribution system, the pressure of the rinse water causing the drain valves to close, as above described, so that the rinse water is applied through the discharge nozzle to the receptacles in the compartment 20, the water being allowed to drain to the exterior waste sump through the waste port 42. At the end of the rinsing period, namely, a period of about one minute, as above mentioned, the timer 226 causes the signal device 228 to be again energized, notifying the operator that the rinsing period is over, and that the washing cycle has been completed. The operator then returns the lever 88 to its vertical position, terminating the supply of fresh water by the action of the valve 86. The door 22 may then be opened and the clean receptacles removed from the cabinet. The apparatus is then ready for the next group of receptacles.

As shown in FIGURE 5, the rear wall of the compartment 20 may be provided with a supporting rack 230 suitably shaped to support various accessory items for cleansing simultaneously with the containers placed in the apparatus.

As shown in FIGURE 1, the sump reservoir 30 is provided with a drain cock 231 which is located in the lower portion of a rectangular housing 232 mounted in an opening in the lower portion of the front wall of the cabinet 18, the front of the housing 232 being open so that free access is provided to the drain cock 231. Also mounted in the housing 232 is a sight glass 233 whose lower end is connected to the interior of the sump reservoir 30, and a thermometer 234 which is in communication with the temperature sensing element 235 mounted in the lower portion of the front wall of the sump reservoir 30, as shown in FIGURE 5. The sight glass 233 and thermometer 234 are mounted on opposite sides of the drain cock 231, as shown in FIGURE 1. The drain cock 231 is connected to the lower portion of the sump reservoir 30 through a suitable conduit, so that the caustic soda, or other cleaning liquid may be drained from the sump reservoir 30 whenever desired. A fresh supply of cleansing liquid may be furnished by pouring same into the compartment 20, the cleansing liquid draining into the sump reservoir 30 through conduit 27, valve housing 36, port 41 and conduit 37.

While certain specific embodiments of an improved machine for washing premix tanks, jugs and similar receptacles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A washing machine for containers comprising a cabinet, a washing compartment in said cabinet, a reservoir in said cabinet containing cleaning liquid, means for supporting inverted containers in said compartment, a plurality of spray nozzles in said compartment, certain of said nozzles being directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a waste conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

2. A washing machine for containers comprising a cabinet, a washing compartment in said cabinet, a reservoir in said cabinet containing cleaning liquid, means for supporting inverted containers in said compartment, a plurality of spray nozzles in said compartment, certain of said nozzles being directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit, and the liquid supply conduit and arranged to selectively connect said liquid supply conduit to either the pump discharge conduit or the rinsing water supply conduit, a waste conduit, means to energize said pump when the selector valve is in a position to connect said pump discharge conduit to said liquid supply conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

3. A washing machine for containers comprising a cabinet, a washing compartment in said cabinet, a reservoir in said cabinet containing cleaning liquid, means for supporting inverted containers in said compartment, a plurality of spray nozzles in said compartment, certain of said nozzles being directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a pressure-responsive drain valve connected to said liquid supply conduit in said compartment, said drain valve closing responsive to liquid pressure in said liquid supply conduit and opening in the absence of such liquid pressure, a waste conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

4. A washing machine for containers comprising a cabinet, a washing compartment in said cabinet, a reservoir in said cabinet containing cleaning liquid, means for supporting inverted containers in said compartment, a plurality of spray nozzles in said compartment, certain of said nozzles being directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit, and the liquid supply conduit and arranged to selectively connect said liquid supply conduit to either the pump discharge conduit or the rinsing water supply conduit, a waste conduit, means to energize said pump for a predetermined time period when the selector valve is in a position to connect said pump discharge conduit to said liquid supply conduit, a pressure-responsive drain valve connected to said liquid supply conduit in said compartment and being closed responsive to liquid pressure in said liquid supply conduit and open in the absence of said pressure, whereby said drain valve opens at the end of said time period, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

5. A washing machine for containers comprising a cabinet having a washing compartment provided with a hinged door, means on said door to support containers in inverted positions in said compartment, a reservoir in said cabinet containing cleaning liquid, a plurality of spray nozzles in said compartment, certain of said nozzles being directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a waste conduit, means to connect said drain conduit to the reservoir when the selector valve is in a position to connect said pump discharge conduit to said liquid supply conduit, and means to connect said drain conduit to the waste conduit when the selector valve is in a position to connect the rinsing water supply conduit to said liquid supply conduit.

6. A washing machine for containers comprising a cabinet having a washing compartment provided with a hinged door, means on said door to support containers in inverted positions in said compartment, a reservoir in said cabinet containing cleaning liquid, a plurality of spray nozzles in said compartment, certain of said spray nozzles being mounted on said door and directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a waste conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

7. A washing machine for containers comprising a cabinet having a washing compartment provided with a hinged door, means on said door to support containers in inverted positions in said compartment, a reservoir in said cabinet containing cleaning liquid, a plurality of spray nozzles in said compartment, certain of said nozzles being directed upwardly and being receivable inside the inverted containers and other nozzles being directed inwardly toward the central portion of the compartment, a liquid supply conduit connected to said nozzle, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, means to substantially prevent opening of said door when the selector valve is in a position to connect the pump discharge conduit to said liquid supply conduit, a waste conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

8. A washing machine for containers comprising a cabinet having a washing compartment provided with a hinged door, means on said door to support containers in inverted positions in said compartment, a reservoir in said cabinet containing cleaning liquid, a plurality of spray nozzles in said compartment, certain of said nozzles being directed upwardly and being receivable inside the inverted containers and other nozzles being directed inwardly toward the central portion of the compartment, a liquid supply conduit connected to said nozzles, a pump in said cabinet having an intake conduit connected to said reservoir and having a discharge conduit, means to prevent energization of said pump when the door is in open position, a drain conduit connected to the bottom of said compartment, a rinsing water supply conduit, a selector valve connected between the pump discharge conduit, the rinsing water supply conduit, and the liquid supply conduit and arranged to selectively connect said liquid supply conduit to either the pump discharge conduit or the rinsing water supply conduit, a waste conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

9. A washing machine for containers comprising a cabinet having a washing compartment provided with a hinged door, means on said door to support containers in inverted positions in said compartment, a reservoir in said cabinet containing cleaning liquid, a plurality of spray nozzles in said compartment, certain of said nozzles being mounted on said door and being directed upwardly and being receivable inside the inverted containers, and other nozzles being directed inwardly toward the central portion of the compartment, a liquid supply conduit connected to said conduit means and said addinet having an intake conduit connected to said reservoir and having a discharge conduit, means to prevent energization of said pump when the door is in open position, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, means to substantially prevent opening of said door when the selector valve is in a position to connect said pump discharge conduit to said liquid supply conduit, a waste conduit, means to energize said pump for a predetermined time period when the selector valve is in a position to connect said pump discharge conduit to said liquid supply conduit, a pressure-responsive drain valve connected to said liquid supply conduit in said compartment and being closed responsive to liquid pressure in said liquid supply conduit and open in the absence of such pressure, whereby said drain valve opens at the end of said time period, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

10. A washing machine for containers comprising a cabinet having a washing compartment provided with a hinged door, bracket means secured to said door, an upwardly directed spray nozzle secured to the lower portion of said bracket means and adapted to be received in the mouth of an inverted container, conduit means connected to said spray nozzle and being adapted to support the inverted container, spaced support members secured to said bracket means and being located to receive the inverted container therebetween, a hook member pivoted to the top portion of said bracket means and being engageable over the inverted container to retain same between said spaced support members, a reservoir in said cabinet containing cleaning liquid, a plurality of additional spray nozzles in said compartment directed inwardly toward the central portion of the compartment, a liquid supply conduit connected to said conduit means and said additional spray nozzle, a pump in said cabinet having an intake conduitt connected to said reservoir and having a discharge conduit. a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a waste conduit, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

11. A washing machine for containers comprising a cabinet having a washing compartment provided with a hinged door, bracket means detachably secured to said door, an upwardly directed spray nozzle secured to the lower portion of said bracket means and adapted to be received in the mouth of an inverted container, conduit means connected to said spray nozzle and being adapted to support the inverted container, support members pivoted to said bracket means and being spaced to receive the inverted container therebetween, means to adjustably secure said support members in spaced relationship, a hook member pivoted to the top portion of said bracket means and being engageable over the inverted container to retain the same between said support members, a reservoir in said cabinet containing cleaning liquid, a plurality of additional spray nozzles in said compartment directed inwardly toward the centrel portion of the compartment, a liquid supply conduit connected to said conduit means and said additional spray nozzles, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a waste conduit, means to connect said drain conduit to the reservoir when the selector valve is in a position to connect the pump discharge conduit to said liquid supply conduit, and means to connect said drain conduit to the waste conduit when the selector valve is in a position to connect said rinsing water supply conduit to said liquid supply conduit.

12. A washing machine for containers comprising a cabinet having a washing compartment provided with a hinged door, bracket means detachably secured to said door, an upwardly directed spray nozzle secured to the lower portion of said bracket means and adapted to be received in the mouth of an inverted container, conduit means connected to said spray nozzle and being adapted to support the inverted container, spaced supports pivoted to said bracket means and being located to receive the inverted container therebetween, means to adjustably secure the support members in divergent relationship, a hook member pivoted to the top portion of said bracket means and being engageable over the inverted container to retain the same between the divergent spaced support members, a reservoir in said cabinet containing cleaning liquid, a plurality of additional spray nozzles in said compartment directed inwardly toward the central portion of the compartment, a liquid supply conduit connected to said conduit means and said additional spray nozzle, a pump in said cabinet having an intake conduit connected to said reservoir and having a discharge conduit, a drain conduit connected to the bottom of said compartment, a rinsing water supply conduit, a selector valve connected between the pump discharge conduit, the rinsing water supply conduit and the liquid supply conduit and arranged to selectively connect said liquid supply conduit to either the pump discharge conduit or the rinsing water supply conduit, a waste conduit, means to energize said pump for a predetermined time period when the selector valve is in a position to connect said pump discharge conduit to said liquid supply conduit, a pressure-responsive drain valve connected to said liquid supply conduit in said compartment and being closed responsive to liquid pressure in said liquid supply conduit and open in the absence of such pressure, whereby said drain valve opens at the end of said time period, means to connect said drain conduit to the reservoir when the selector valve is in a position to connect said pump discharge conduit to said liquid supply conduit, and means to connect said drain conduit to the waste conduit when the selector valve is in a position to connect said rinsing water supply conduit to said liquid supply conduit.

References Cited in the file of this patent
UNITED STATES PATENTS

| | | |
|---|---|---|
| 1,661,602 | Dary | Mar. 6, 1928 |
| 2,066,232 | Schmidt | Dec. 29, 1936 |
| 2,558,628 | Redin | June 26, 1951 |
| 2,561,631 | Negri | July 24, 1951 |
| 2,575,493 | Hilliker | Nov. 20, 1951 |